Nov. 15, 1966 M. A. WHITFIELD ETAL 3,285,718
METHOD OF SOLIDIFYING LIQUID FUEL AND PRODUCT THEREBY OBTAINED
Filed March 11, 1963

INVENTORS
MARION A. WHITFIELD
JAMES B. DOBBS
BY William D. Harris, Jr.

United States Patent Office 3,285,718
Patented Nov. 15, 1966

3,285,718
METHOD OF SOLIDIFYING LIQUID FUEL AND PRODUCT THEREBY OBTAINED
Marion A. Whitfield, Dallas, and James B. Dobbs, Irving, Tex., assignors to The Western Company of North America, Fort Worth, Tex., a corporation of Delaware
Filed Mar. 11, 1963, Ser. No. 264,379
12 Claims. (Cl. 44—7)

This invention relates to solidification of normally liquid fuels and to the product thereby obtained.

An important aspect of the present invention is directed to a system for changing fuels from the liquid state to the solid state.

Viewed in one light, the present invention relates to a composition of matter which ranges in viscosity from a jelly-like mass to a substantially firm material that finds utility both as a safety means to render liquid fuel systems much less dangerous under emergency conditions, and as a solid fuel having utility, for example, as a canned source of fuel for cooking and the like.

Viewed in a more specific light, the present invention comprehends a method and system for rendering the fuel systems of aircraft much safer under emergency conditions.

In the handling and/or control of liquid fuel constituents, it is often desirable to render them solid. Conditions at the site of an air crash are often must more serious than they otherwise might be because of the impact distribution of large quantities of liquid fuel.

An important embodiment of the present invention is directed to improvements in fuel control and in rendering fuels solid which are normally in the liquid state. The fuel when made solid desirably is stable and is not thixotropic.

In accordance with a preferred embodiment of the present invention, there is provided a system for solidfying vehicular fuel which is normally liquid. More particularly, in accordance with the invention, a base material is mixed with a body of fuel containing an organic acid, preferably a fatty acid. The acid and base preferably are in liquid form. The volumes of acidic and base liquids each constitute less than about 5 percent of the fuel volume and preferably less than about 2 percent and form a rigid skeletal framework within which the fuel is bound.

A preferred embodiment of the invention is directed to a system for incorporating an arresting structure in a liquid fuel body which may be operative in response to the occurrence of a control state to change the fuel from a liquid to a relatively solid state and in which solid state the structure is stable under high shear stresses.

In a further and more specific aspect of the invention a system is provided for rendering a liquid jet fuel solid by substantially simultaneous forceful injection of an organic acid and an aqueous base into the fuel in volume ratios preferably less than one volume each per 100 volumes of fuel. Provision is made for the forceful injection into a fuel containing certain fatty acids of a suitable base to form cross linkages with the fatty acid to form a non-thixotropic solid.

More particularly, in accordance with the invention, there is provided a fuel container for a vehicle which includes means for dispersing throughout the fuel an organic acid, oleic acid, linoleic acid, stearic acid, palmitic acid, myristic acid and linolenic acid, being preferred. To this fuel there is then provided for the forceful injection of a suitable base, preferably the hydroxide of sodium, calcium, potassium, barium, lithium or ammonium.

In a preferred form of the invention, a fuel system including a fuel container for a vehicle provided with at least a pair of auxiliary containers of a combined capacity of at least about 1.5% of the total volume of the fuel container. At least one of said containers carries a suitable base, and the other a suitable organic acid. Means are provided for injection of the base and acid into the fuel upon encountering conditions of peril or impending accident.

For a complete understanding of the present invention and for further objects and advantages thereof, reference may now be had to the following description taken in conjunction with the accompanying drawings in which.

Figure 3:
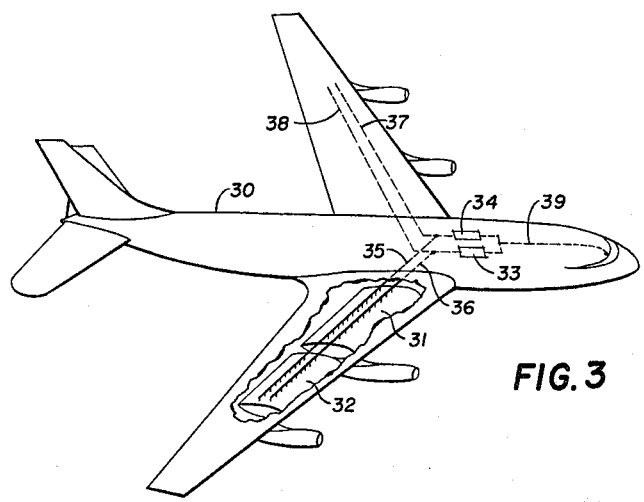

FIGURE 3 ilustrates application of the invention to an aircraft; and

Figure 4:
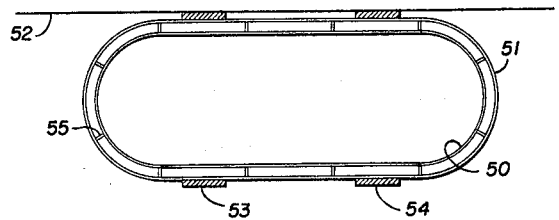

FIGURE 4 is a modified control system.

Systems illustrated in the accompanying drawings portray the application of the present invention for reducing hazard in transport vehicles as in crash conditions and the like. Preferably, provision is made for injecting structure-building chemicals into a fuel storage system of a vehicle substantially instantaneously to solidfy the fuel and thereby minimize the distribution of the fuel upon impact.

Figure 1:
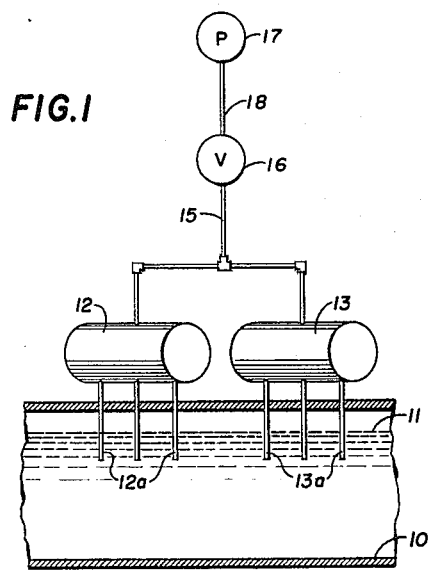
FIGURE 1 illustrates a fuel control system incorporating the present invention.

In FIGURE 1 a fuel tank 10 is shown, partially in section, with a fuel liquid standing therein at level 11. The fuel may be gasoline or jet fuel of the type employed in aircraft, boats, automobiles, or other vehicles. A pair of control tanks 12 and 13 are mounted adjacent to tank 11. A plurality of nozzles 12a extend from tank 12 into the tank 10. Similarly, a plurality of nozzles 13a extend from tank 13 into tank 10. Tanks 12 and 13 normally are filled with a pair of structure-building constituents, which constituents are maintained separated in tanks 12 and 13 pending their injection into the tank 10. In accordance with one aspect of the invention, a pressure line 15 is connected to both of tanks 12 and 13 and leads to a control valve 16. A pressure source, such as a tank 17, is connected by way of line 18 to the valve 16.

In operation, when valve 16 is actuated, the constituents stored in tanks 12 and 13 are forcefully injected into tank 10 to form therein a solid framework or lattice which includes both of the injected constituents and the fuel in the tank 10. As a result, there instantaneously is formed a solid fuel mass which is of properties such that it will retain its integrity under conditions of high shear as encountered upon rupture of tank 10. The pressure source 17, valve 16 and the tanks 12 and 13 have been shown in diagrammatic form. The tanks 12 and 13 are secured by suitable means (not shown) to the tank 10 in order to maintain them in operative relationship for a period of time sufficient to inject chemicals in the tanks 12 and 13 into tank 10. While a limited number of jets are shown, the tank 10 may be provided with a multiplicity of flow lines therein for wide dispersal of the two additives.

Figure 2:
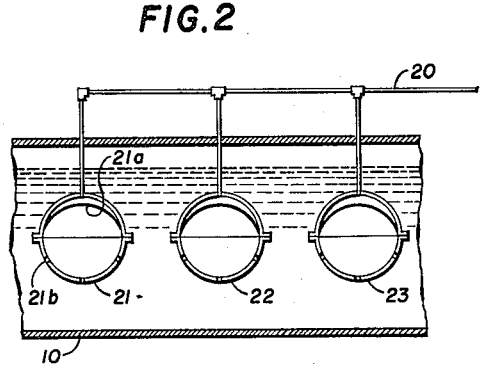
FIGURE 2 illustrates a modification of the system of FIGURE 1.

FIGURE 2 illustrates a further embodiment of the invention in which the pressure line 20, corresponding with line 15 of FIGURE 1, is connected to each of a plurality of tanks 21, 22 and 23. Tanks 21–23 are supported interiorly of the tank 10. Tanks 21–23 are shown in section. Each tank is provided with an internal diaphragm, such as diaphragm 21a. A plurality of ports, such as port 21b, are located on the side of the diaphragm 21a opposite the connection of the line 20. Each of the ports 21b is provided with frangible closure means so that, upon application of pressure on line 20, the closure means will rupture, whereupon actuation of the diaphragm 21a will eject chemicals stored in the tank 21 into the liquid in tank 10. The containers 21 and 22 contain the acid and base constituents which, upon injection into the fuel in tank 10, combine to form a crystalline solid structure incorporating the fuel therein.

In a still further aspect of the invention, tanks 21–23 may be incorporated in a fuel tank, such as tank 10, without any external actuating connection such as the line 20. In this case, the tanks 21–23 will of themselves be frangible in nature and are anchored to tank 10 by means such that, when subject to deceleration in excess of a predetermined level, the containers themselves will break, permitting dispersion of the chemicals contained therein throughout the fuel in tank 10. In this case it will be preferred that the containers 21–23 be pressurized and thus of an explosive nature so that when they experience deceleration of above a critical limit, there will be substantial dispersion of the chemicals therein throughout the body of the fuel in tank 10.

FIGURE 3 illustrates an application of the invention. A jet transport 30 having wing fuel tanks 31 and 32 in the right wing is connected to a pair of containers 33 and 34 by way of lines 35 and 36, respectively. Similar connections are provided as shown by dotted lines 37 and 38 to fuel tanks in the left wing. As indicated by the dotted linkage 39, a control line leads from the tanks 33 and 34 to the cockpit area where control may be exercised by a pilot. Upon actuation of a suitable control, as in the manner illustrated in FIGURE 1, chemicals in tanks 33 and 34 are injected through lines 35 and 36 into tanks 31 and 32 to render solid the fuel constituents therein with which the chemicals are mixed.

Applicants have found that jet fuels, for example, may be rendered solid substantially instantaneously with the injection therein of suitable additive materials. Such materials are readily available and may be stored for substantial periods pending the need for use thereof without altering in any way the operation of an aircraft or other transport vehicle prior to the occurrence of conditions which bring into play the provisions of the present invention.

In FIGURE 4 a further embodiment of the invention is illustrated in which a fuel tank 50 is encased within an outer container 51. The container 50 is supported from a vehicle frame element 52 by hanger straps 53 and 54. The inner container 50 is maintained spaced from the outer container 51 by a suitable weblike structure 55 placed therebetween. Fuel for the vehicle or fuel transported by the vehicle may be placed within the inner container 50. In accordance with one aspect of the invention, fatty acids of the type here specified may be added to and made a part of the fuel without materially modifying the fuel characteristics. The zone between the tanks 50 and 51 may then be filled with an alkaline metal hydroxide, such as sodium hydroxide. So long as the inner tank remains intact, the constituents for solidifying the fuel will be maintained separated. However, if the inner tank is ruptured, commingling of the fuel and the base material will produce solidification. The amount of solidification will depend at least in part upon the extent to which the tank is ruptured. If a relatively small hole is formed through the containers 50 and 51, the stream issuing therefrom will comprise both the fuel containing the fatty acid and the base so that the material flowing therefrom will be solidified and will maintain maximum safety in the area of dispersal.

EXAMPLE 1

It has been found that the most favorable results for rapidly forming a solid from a fuel such as a jet fuel are achieved by using fatty acids of the class which consists of oleic, linoleic, stearic, palmitic, myristic, and linolenic acids. A specific mixture which has been found to be the most satisfactory comprises equal portions of two fatty acids, A1 and A2. Acid A1 was made up to a tall oil fatty acid. Acid A2 was a fatty acid of vegetable origin.

Acid A1 had the following composition:

| | Percent |
|---|---|
| Linoleic, conjugated | 8.0 |
| Linoleic, nonconjugated | 36.0 |
| Oleic | 50.0 |
| Saturated | 6.0 |

The fatty acid A2 of vegetable origin had the following constituents and proportions (dimer, trimer and polymer acids generally are given on the basis of their parent acid unit in the foregoing analysis):

| | Percent |
|---|---|
| Oleic | 41.0 |
| Linoleic | 5.0 |
| Stearic | 7.0 |
| Palmitic | 13.0 |
| Myristic | 10.0 |
| Linolenic | 18.0 |
| Other saturated and unsaturated fatty acids | 6.0 |

The composition of A2, taking polybasic polymer acids into account is generally as follows:

| | Percent |
|---|---|
| C14 material | 10 |
| C16 material | 14 |
| C18 material | 24 |
| C20 material | 2 |
| Polybasic acids | 50 |

Table I illustrates the effectiveness of the addition of constituents to a jet fuel:

*Table 1*

| | Gelling Agents Total Vol. Percent | B/A1+A2[1] | Gelation Time (Secs.) | Type Gel |
|---|---|---|---|---|
| 1 | 5 | 1:1 | 3–5 | Solid, crumbly. |
| 2 | 2.50 | 1:1 | 7.6 | Solid. |
| 3 | 2 | 1:1 | 8.7 | Jelly-like (flows slowly). |
| 4 | 1.75 | 1:1 | 7 | Jelly-like, pourable, firms on standing a few seconds. |
| 5 | 1.375 | 1.75:1 | 30 | Pourable, but in 1 min. was about like 4 above. |

[1] Where B was a 50% concentration sodium hydroxide solution.

It will be noted that a solid fuel body was formed in less than eight seconds where as low as 2.5% additives (combined base and acid) were injected into the fuel.

It has been found that the time interval between known extreme hazard conditions and the actual beginning of flow of liquid fuel from a tank ruptured upon impact is generally of the order of in excess of two seconds. Any degree to which the flow of fuel at such a site can be lowered is desirable. The above table indicates that the mixture could be rendered solid in a time interval of as low as three seconds. Thus, there is provided a substantial improvement in the limitation of scattering of fuel.

An example of a satisfactory commercially obtainable fatty acid A1 is a material manufactured by Arizona Chemical Company, and identified as Acintol FA1 Tall Oil Fatty Acid.

An example of a commercially available material which may be utilized as the acid A2 is that material which is obtainable from the Harchem Division of Wallace & Tiernan, Inc. and identified as Century 1475 Fatty Acid. Century 1475 includes approximately 50% of polybasic polymer acids. Other fatty acids from the same source such as identified by Century D–75 Polymerized Fatty Acid and Century D–85 Polymerized Fatty Acid are also satisfactory as constituent A2. Century D–75 is a polymerized fatty acid, consisting of a mixture of dimer, trimer, and high molecular weight acids, and Century D–85 is likewise a polymerized fatty acid. The Century fatty acids are characterized by including a substantial percentage of dimer and trimer acids. The availability of such constituents makes possible a high incidence of cross linkages through the metal of the hydroxide to form with the fuel a solid structure. For best results, in accordance with the present invention, it is necessary that an effective proportion, at least about one-eighth of one percent of the total liquids involved in the gelled fuel, consists of polybasic fatty acid polymer, at least dimer.

While the foregoing example represents a preferred chemical composition in preferred proportions, particularly as the instant invention relates to providing an important safety means for normally liquid fuel systems, the following examples illustrate various other embodiments of considerable importance.

*Example 2*

Five cc. of 50%, by weight, sodium hydroxide solution were poured rapidly into a beaker containing a mixture of 100 cc. of jet fuel and 10 grams of stearic acid. Conventional agitation was provided by a laboratory stirrer. Within about ten seconds a thick gel had formed, having a consistency like that of thick applesauce.

*Example 3*

To a container holding 100 cc. of jet fuel, having mixed therewith 5 cc. of oleic acid, was added 5 cc. of 50%, by weight, sodium hydroxide solution. A conventional laboratory stirrer was employed during the addition, which was relatively rapid. Within five seconds from the time fluid was first introduced, a gel had formed. The gel had a rather thin applesauce like consistency. Its viscosity was increased much in excess of 100-fold over the viscosity of the jet fuel.

EXAMPLE 4

Twenty-four cc. of formic acid and 45 cc. of 50%, by weight, sodium hydroxide solution were introduced into 100 cc. of jet fuel while mixing the same with a conventional laboratory stirrer. With about 15 seconds, a thick applesauce like mass was formed of the constituents enumerated.

EXAMPLE 5

Thirty cc. of 50% sodium hydroxide solution, by weight, were added to a mixture of 100 cc. of jet fuel and 20 cc. of acetic acid while stirring with a conventional laboratory stirrer. Within about fifteen seconds, a medium thick applesauce type gel had formed.

EXAMPLE 6

Two cc. of 50% by weight, sodium hydroxide solution, were quickly poured into a beaker containing 100 cc. of jet fuel mixed with 5 cc. of the high dimer acid content solution previously referred to as A2 in Example 1 hereof. Conventional laboratory agitation was employed as in the prior example. Within about five seconds, a firm, solid gel had formed.

EXAMPLE 7

Six cc. of 50%, by weight, sodium hydroxide were quickly added to a beaker containing 100 cc. of jet fuel mixed with 6 cc. of caprylic acid. Conventional laboratory agitation was employed, as in the prior example. Within less than ten seconds, a gel had formed. It had the consistency of thin applesauce. After standing about five minutes, the gel became quite thick, but could still be poured. Its viscosity at this time was comparable to molasses.

EXAMPLE 8

Two cc. of sodium methylate were added to a beaker containing 100 cc. of jet fuel mixed with 4 cc. of a solution containing 50% by volume, of the acid previously defined herein (in Example 1) as A2 and 50%, by volume, of the acid previously defined herein (in Example 1) as A1. Conventional laboratory agitation was employed as in prior examples. In about ten seconds, a thick gel of heavy applesauce consistency had formed.

EXAMPLE 9

Example 8 was repeated, but 2 cc. of triethylenetetramine were substituted for the 2 cc. of sodium methylate therein used. A thin gel of low viscosity formed in about two minutes. While this gel was considerably higher in viscosity than might be desirable for many applications, it is pointed out that it was in the order of magnitude of about 100 times as viscous as the fuel involved (jet fuel).

EXAMPLE 10

Ten cc. of concentrated ammonium hydroxide solution were quickly poured into a beaker containing 100 cc. of yet fuel mixed with 10 cc. of a mixture containing 40% of A1 (see Example 1) and 60% of A2 (see Example 1). Conventional laboratory agitation was employed. In between five and ten seconds, a very viscous rather stringy gel had formed having a viscosity comparable to molasses.

EXAMPLE 11

Ten cc. of a saturated solution of lithium hydroxide were quickly added to a beaker containing a mixture of 100 cc. of kerosene and of 5 cc. of a mixture of 60% of A2 and 40% of A1 (A2 and A1 being defined in Example 1 hereof), while conventional laboratory stirring was employed. After about fifteen minutes, a relatively thin gel had formed.

EXAMPLE 12

Ten cc. of barium hydroxide (a saturated solution containing some suspended solids) were added to a mixture of 100 cc. of kerosene and 5 cc. of the mixture of A1 and A2 utilized in Example 11 above. Conventional laboratory agitation was provided. A gel began to form, and after the total lapse of about ten minutes, the gel had thickened to the consistency of applesauce.

EXAMPLE 13

Five cc. of potassium hydroxide solution of 50% concentration, by weight, were added to a mixture of 100 cc. of kerosene and 5 cc. of the mixture of A1 and A2 employed in the preceding example. A conventional laboratory stirrer was operated during the addition. In less than ten seconds after the time that the base and fuel-acid combination were combined, a firm solid gel had formed.

EXAMPLE 14

Five cc. of 50%, by weight, sodium hydroxide solution were added to a fuel-acid mixture consisting of 100 cc. of lauryl alcohol and 5 cc. of a mixture 50%, by volume, of A1 and 50%, by volume, of A2 (A1 and A2 being defined in Example 1 hereof). Conventional laboratory agitation was provided during the addition. In less than fixe seconds from the time that the addition of sodium hydroxide had started, a gel had formed. The gel was quite viscous, being a bit thinner than applesauce. On standing for about ten minutes, the gel set into a firm solid.

EXAMPLE 15

Five cc. of sodium hydroxide solution, 50%, by weight, were added to a fuel-acid mixture containing 100 cc. n-decanol and 5 cc. of a mixture of 60%, by volume, of A2 and 40%, by volue, of A1 (A1 and A2 having been defined in Example 1 hereof), while agitating the mixture by conventional laboratory means. In a short time a thin gel had formed of about the same consistency as that of Example 14. The gel increased in thickness upon standing, but did not solidify.

EXAMPLE 16

Example 15 was repeated, but 100 cc. of two-octyl alcohol were substituted for the n-decanol therein used. Within 20 seconds after addition of the base had started, the liquid components combined had solidified into a firm solid.

EXAMPLE 17

Example 16 was repeated, but using n-amyl alcohol in place of the iso-octyl alcohol therein employed, the other procedures being the same. In less than thirty seconds a gel of heavy applesauce consistency had formed.

EXAMPLE 18

Example 17 was repeated, but using 100 cc. of ethyl alcohol in place of the 100 cc. of n-amyl alcohol therein employed. Within about ten seconds, a gel had formed having about the viscosity of heavy molasses. On standing four minutes, the gel became a firm solid.

EXAMPLE 19

Example 18 was repeated, but 100 cc. of methyl alcohol were used in place of the 100 cc. of ethyl alcohol therein employed. Essentially the same results were obtained.

EXAMPLE 20

Five cc. of sodium hydroxide solution, 50% by weight, and 5 cc. of a mixture of 50%, by volume, A1 and 50%, by volume, A2 (A1 and A2 having previously been defined in Example 1 hereof) were injected rapidly with hypodermic syringes into a beaker containing 100 cc. of jet fuel. The injection was such that a high degree of agitation was obtained, and, dispersion of the acid and base throughout the jet fuel was complete within a very short period of time—about one second. After a total lapsed time of not more than about two seconds, a heavy gel had formed, being essentially a solid.

Comparison of the results of Example 20 with the results of comparable examples above shows that a satisfactory gel, indeed, a solid, is formed within a much shorter period of time than might be expected. This shows the importance of rapid, forceful injection of the components for those applications where speed of gel formation is important, e.g., in the aircraft safety aspects of this invention. Where large fuel tanks are involved, as in aircraft, and relatively small quantities of the base and acid are being added thereto, the importance of such rapid, forceful injection to obtain a high degree of dispersion of the components is emphasized.

In addition to the bases given in the foregoing examples, it has been found that calcium hydroxide works satisfactorily in the practice of the present invention to produce a substantially more viscous fuel. Also, other amines may be employed, e.g., tetraethylenepentamine and aminoethanol.

It has been found that the fuel is made more viscous and less dangerous when organic acids having at least six carbon atoms are employed.

The importance of polybasic fatty acid polymer, at least dimer, in most effective practice of the present invention, is quite aptly illustrated by comparing the foregoing examples employing the preferred base, sodium hydroxide, with various acids. Thus, in Example 1, a solid gel was quickly obtained employing polybasic fatty acid polymer, while Examples 2–5 gave a non-solid gel of applesauce consistency.

The preferred embodiment of our invention relating to aircraft safety is preferably practiced under conditions, and with compositions in volumes, such that a viscosity increase of at least 100-fold, compared to the fuel alone, is obtained in less than ten seconds from the time that the safety system is activated to combine the chemical components involved. Ideally, a solid material is formed within said ten second period; however, if a 100-fold increase in viscosity is realized, this materially reduces the chances of wide dispersion of fuel accompanied by a material increase in safety.

The solid formed incident to the safety aspects of the present invention is found to be essentially non-thixotropic. This is most desirable since under high impact conditions, the solid yields little or no liquid material.

Considering the fuel aspects of the present invention it is most desirable that the product be a solid. By a solid, whenever that term is used herein, is meant a material having a positive, finite yield point. Such a solid is not deformed by a small stress.

Having described the invention in connection with certain specific embodiments thereof, it is to be understood that further modifications may now suggest themselves to those skilled in the art, and it is intended to cover such modifications as fall within the scope of the appended claims.

What is claimed is:

1. The method of rapidly making a liquid fuel into a solid gel comprising: contacting a base selected from the group consisting of alkali metal hydroxides, ammonium hydroxide, calcium hydroxide, barium hydroxide, triethylenetetramine, tetraethylenepentamine, and aminoethanol, with an organic acid material having at least one carboxylic group attached to a hydrocarbon group of at least six carbon atoms, in the presence of and dispersed throughout said liquid fuel, said organic acid including an effective proportion, no less than about one-eighth of one percent, based on the total original volume of base, acid, and fuel, of polybasic fatty acid polymer, at least dimer.

2. The method of reducing hazard from the burning of the fuel from the liquid fuel system of a vehicle in distress, by causing said fuel to rapidly form a solid gel comprising:
    (a) rapidly forcefully injecting at least one of two reagents into the fuel to disperse it throughout said fuel;
    (b) no later than the time of injection of said reagent, mixing the other of said two reagents with said fuel;
    (c) one of said reagents comprising an organic acid material having at least one carboxylic acid group attached to a hydrocarbon group with at least 6 carbon atoms, said organic acid including an effective proportion, no less than about one-eighth of one percent based on the total original volume of said two reagents and said fuel, of polybasic fatty acid polymer, at least dimer; and
    (d) the other of said two reagents comprising an effective gelling proportion of a base selected from the group consisting of alkali metal hydroxides, ammonium hydroxide, calcium hydroxide, barium hydroxide, triethylenetetramine, tetraethylenepentamine, and aminoethanol.

3. A rapidly gelled solid fuel comprising a relatively minor proportion of the salt of an organic acid material having at least one carboxylic acid group attached to a hydrocarbon group with at least six carbon atoms and a base selected from the group consisting of alkali metal hydroxides, ammonium hydroxide, calcium hydroxide, barium hydroxide, triethylenetramine, tetraethylenepentamine, and aminoethanol, and a relatively major proportion of a fuel selected from the group consisting of normally liquid hydrocarbons and alcohols, said fuel being dispersed throughout and bound into said salt, which serves as a matrix for said fuel said organic acid material comprising an effective proportion, no less than about one-eighth of one percent based on the total original volume of constituents of which said gelled fuel is made, on a liquid basis, of a polybasic fatty acid polymer, at least dimer.

4. The method of claim 1 in which said organic acid material comprises a major proportion of organic acid having at least one carboxylic acid group attached to a hydrocarbon group of between 13 and 19 carbon atoms, said polybasic acid polymer consisting of a major proportion of polybasic fatty acid polymer of monomeric acid having between 14 and 20 carbon atoms per molecule.

5. The method of claim 4 in which said base is sodium hydroxide.

6. The method of claim 4 in which said base is potassium hydroxide.

7. The method of claim 2 in which said organic acid material comprises a major proportion of organic acid having at least one carboxylic acid group attached to a hydrocarbon group of between 13 and 19 carbon atoms, said polybasic acid polymer consisting of a major proportion of polybasic fatty acid polymer of monomeric acid having between 14 and 20 carbon atoms per molecule.

8. The method of claim 7 in which said base is sodium hydroxide.

9. The method of claim 7 in which said base is potassium hydroxide.

10. The method of claim 3 in which said organic acid material comprises a major proportion of organic acid having at least one carboxylic acid group attached to a hydrocarbon group of between 13 and 19 carbon atoms, said polybasic acid polymer consisting of a major proportion of polybasic fatty acid polymer of monomeric acid having between 14 and 20 carbon atoms per molecule.

11. The method of claim 10 in which said base is sodium hydroxide.

12. The method of claim 10 in which said base is potassium hydroxide.

References Cited by the Examiner

UNITED STATES PATENTS

| | | | |
|---|---|---|---|
| 1,266,080 | 5/1918 | Strobl | 44—7 |
| 1,844,754 | 2/1932 | Geller | 44—7 |
| 2,174,793 | 10/1939 | Langan et al. | 252—126 |
| 2,289,316 | 7/1942 | Myers | 252—123 |
| 2,374,913 | 5/1945 | Beerbower et al. | 252—39 |
| 2,455,649 | 12/1948 | Beerbower et al. | 44—7 |
| 2,751,284 | 6/1956 | Hill et al. | 44—7 |
| 2,789,040 | 4/1957 | Goff et al. | 44—7 |
| 2,850,458 | 9/1958 | Beerbower et al. | 252—39 |
| 2,866,754 | 12/1958 | Cardwell et al. | 44—7 |
| 2,873,178 | 2/1959 | Bedford | 44—7 |
| 2,914,476 | 11/1959 | Alderman et al. | 44—7 |
| 2,922,799 | 1/1960 | Baumgartner | 44—7 |
| 2,951,664 | 9/1960 | Smith | 244—135 |
| 2,952,427 | 9/1960 | Armstrong | 244—135 |
| 2,966,401 | 12/1960 | Myerholtz | 44—7 |
| 3,012,966 | 12/1961 | Copes et al. | 44—7 |
| 3,036,899 | 5/1962 | Schnider | 44—7 |
| 3,113,849 | 12/1963 | McCoy | 44—7 |

DANIEL E. WYMAN, *Primary Examiner.*

IRVING VAUGHN, C. F. DEES, *Assistant Examiners.*